United States Patent [19]

Joyce et al.

[11] Patent Number: 4,992,482

[45] Date of Patent: Feb. 12, 1991

[54] POLYPHENYLENE ETHER - ALKENYL AROMATIC POLYMER BLENDS HAVING ORGANOBROMINE ADDITIVES

[75] Inventors: James M. Joyce, Chesapeake; Donald J. Kelley, Suffolk, both of Va.

[73] Assignee: Huntsman Chemical Corporation, Salt Lake City, Utah

[21] Appl. No.: 492,499

[22] Filed: Mar. 12, 1990

Related U.S. Application Data

[62] Division of Ser. No. 377,260, Jul. 10, 1989, Pat. No. 4,927,858.

[51] Int. Cl.$^5$ ................................................ C08J 9/18
[52] U.S. Cl. ........................................ 521/59; 521/56; 521/60; 521/88; 521/90; 521/139; 521/907
[58] Field of Search .................... 521/56, 59, 60, 88, 521/90, 139, 907

[56] References Cited

U.S. PATENT DOCUMENTS 4,927,858  5/1990  Joyce et al. .......................... 521/90

Primary Examiner—Morton Foelak
Attorney, Agent, or Firm—Jon C. Christiansen; David R. Black

[57] ABSTRACT

Certain organobromines are added to blends of polyphenylene ether and alkenyl aromatic polymer to reduce mold cool time of the composition. These organobromines also reduce residual blowing agent in the composition after expansion and especially following molding of the composition. The organobromines of this invention are as follows:
tetrabromocyclooctane
hexabromocyclododecane
tetrabromovinylcoclohexene
bis(allyl ether) of tetrabromobisphenol A 34 Claims, No Drawings

POLYPHENYLENE ETHER - ALKENYL AROMATIC POLYMER BLENDS HAVING ORGANOBROMINE ADDITIVES

The application is a divisional of S.N. 377,260 filed July 10, 1989, now U.S. Pat. No. 4,927,858.

INTRODUCTION

This invention relates to expandable blends of polyphenylene ether and alkenyl aromatic polymer and to the addition of certain organobromines to such blends. The invention includes compositions and the processes to produce compositions.

Expandable blends of polyphenylene ether resins ("PPE") and alkenyl aromatic polymers ("PS") (hereinafter "PPE/PS" blends or compositions) are known. PPE can be added to an alkenyl aromatic polymer such a polystyrene to improve impact strength, flammability ratings, tensile strength and other mechanical properties. PS can be added to polyphenylene ether resins to improve processability. Commercially available PPE/PS blends can be used in the practice of this invention. These PPE/PS blends are thermoplastics which are extrudable and moldable into articles of manufacture. Such extrusion and molding technology is well known to persons of ordinary skill in the art. These PPE/PS blends are expandable through the use of blowing agents to materials having densities less than 30 lbs. per cubic foot.

PPE/PS blends are produced in the form of pellets, beads or other particles. The pellets beads or other particles are subjected to expansion to form expanded beads or other expanded particles. A blowing agent is typically used to facilitate or allow for the expansion. Such expansion technology is well known to persons of ordinary skill in the art. The beads or other expanded particles can be used for the manufacture of molded articles. The beads or other expanded particles can be placed into a mold and heated to a selected or desired temPerature. The PPE/PS blend in the mold is then cooled. The mold cool time required by a particular PPE/PS blend is an important characteristic of the blend.

One objective of this invention is to reduce the mold cool time of PPE/PS blends.

Another objective of this invention is to reduce the amount of residual blowing agent associated with PPE/PS blends following expansion and especially following molding.

These objectives and other objectives, advantages and aspects of the invention are described more fully below.

SUMMARY OF INVENTION

We have discovered that certain organobromines can reduce the mold cool time of PPE/PS compositions. Furthermore, these organobromines can reduce the amount of residual blowing agent associated with PPE/PS compositions following expansion, especially following molding of the composition. Our inventive composition is comprised of a PPE/PS blend and at least one of the following organobromines;
tetrabromocyclooctane
hexabromocyclododecane
tetrabromovinylcyclohexene
bis(allyl ether) of tetrabromobisphenol A We have also discovered that the use of dicumyl peroxide in combination with the organobromine further improves (reduces) mold cool time of PPE/PS compositions.

DETAILED DESCRIPTION OF INVENTION

Polyphenylene ether resins ("PPE") useful in the practice of this invention (i.e. which are combinable with alkenyl aromatic polymers to produce a blend) are described in the patent literature including U.S. Pat. Nos. 3,306.874 and 3,306,875 (Hay) and U.S. Pat. Nos. 3.257.357 and 3.257,358 (Stamatoff). These patents are incorporated by reference herein. Although this invention is not limited thereto, it is preferred that the polyphenylene ether resin employed in the PPE/PS blend be a homopolymer or copolymer having units of the following formula:

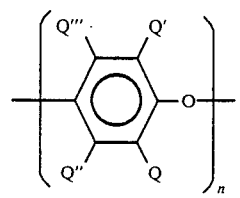

wherein Q, Q' Q" and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least about 50.

The polyphenylene ether resin can be prepared in accordance With knoWn procedures, such as those described in the above mentioned patents of Hay and Stamatoff, from the reaction of phenols including but not limited to:
2,6-dimethylphenol,
2,6-diethylphenol,
2,6-dibutylphenol,
2,6-dipropylphenol,
2,6-diphenylphenol,
2-methyl-6-tolylphenol,
2-methyl-6-methoxyphenol,
2,3,6-trimethylphenol,
2,3,5,6-tetramethylphenol, and
2,6-diethyoxyphenol.

Each of these may be reacted alone to produce the corresponding homopolymer, or in pairs or with still other phenols to produce the corresponding copolymer. Examples of the homopolymer include:
poly(2,6-dimethyl-1,4-phenylene ether),
poly(2,6-diethyl-1,4-phenylene ether),
poly(2,6-diauryl-1,4-phenylene ether),
poly(2,6-dipropyl-1,4-phenylene ether),
poly(2,6-diphenyl-1,4-phenylene ether),
poly(2-methyl-6-tolyl-1,4-phenylene ether),
poly(2-methyl-6-methoxy-1,4-phenylene ether),
poly(2-methyl-6-butyl-1,4-phenylene ether),
poly(2,6 -dimethoxy-1,4-phenylene ether),
poly(2,3,6-trimethyl-1,4-phenylene ether),
poly(2,3,5,6-tetramethyl-1,4-phenylene ether), and
poly(2,6-diethyoxy-1,4-phenylene ether).

Examples of the copolymer include copolymers of 2,6-dimethylphenol with other phenols, such as poly(2,6-dimethyl-co-2,3,6-trimethyl-1,4-phenylene ether)

and poly(2,6-dimethyl-co-2-methyl-6-butyl-1,4-phenylene ether).

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are:

poly(2,6-dimethyl-1,4-phenylene)ether,
poly(2,6-diethyl-1,4-phenylene)ether,
poly(2-methyl-6-ethyl-1,4-phenylene ether),
poly(2-methyl-6-propyl-1,4-phenylene ether),
poly(2,6-dipropyl-1,4-phenylene)ether, and
poly(2-ethyl-6-propyl-1,4-phenylene)ether.

The most preferred polyphenylene ether resin for purposes of the present invention is poly(2,6-dimethyl-1,4-phenylene)ether.

The polyphenylene ether of the composition of this invention can be a polyphenylene ether resin of a single kind or can be a plurality of polyphenylene ether resins of different kinds. For example, the polyphenylene ether can be a mixture of polyphenylene ether resins such as poly(2,6-dimethyl-1,4-phenylene) ether and poly(2,6-dipropyl-1,4-phenylene) ether. Unless stated otherwise or unless the context requires otherwise, any reference in this disclosure or the claims to polyphenylene ether shall mean and include a single polyphenylene ether resin or a mixture of a plurality of different polyphenylene ether resins.

Alkenyl aromatic polymers ("PS") useful in the practice of this invention (i.e. which are combinable with polyphenylene ether to produce a blend) are described in the patent literature including U.S. Pat. No. 4,727,093 (Allen). This patent is incorporated by reference herein. The term "alkenyl aromatic polymer" as it is employed herein is intended to encompass homopolymers, as well as rubber modified high impact varieties, and also copolymers and terpolymers of alkenyl aromatic compounds with one or more other materials. Preferably, the alkenyl armomatic polymer is based at least in part on units of the following formula:

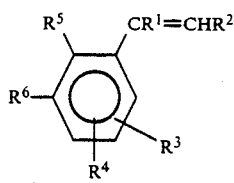

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl and alkenyl groups of from 1 1 to 6 carbon atoms; $R^5$ and $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

The above formula includes styrene, as well as homologs and analogs of styrene. Specific examples include, in addition to styrene, chlorostyrene, bromostyrene, alpha-methyl styrene, para-methyl styrene, vinyl styrene, divinylbenzene and vinyl naphthalene. Styrene is especially preferred.

By way of illustration, the alkenyl aromatic polymer (PS) can be homopolystyrene or other alkenyl aromatic homopolymer which has been modified by admixture or interreaction with a natural or synthetic rubber, for example, polybutadiene, polyisoprene, EPDM rubber or silicone rubber, or it can be copolymer or terpolymer of styrene or other alkenyl aromatic compound with an elastomeric or other material, such as block copolymer of styrene and butadiene (for example, AB, ABA, ABAB or ABABA type), including hydrogenated forms of the foregoing, a radial teleblock copolymer of styrene, butadiene and a coupling agent, including hydrogenated forms, terpolymers of acrylonitrile, styrene and butadiene (ABS), styrene-acrylonitrile copolymers (SAN), and a copolymer of styrene and maleic anhydride (SMA); or it can also be an alkenyl aromatic copolymer or terpolymer which has been modified with rubber, for example, rubber modified styrene-maleic anhydride copolymer. Many of these are described in the patent literature, including the Cizek patent mentioned below.

The alkenyl aromatic polymer of the composition of this invention can be an alkenyl aromatic polymer of a single kind or a plurality of alkenyl aromatic polymers of different kinds. For example, the alkenyl aromatic polymer can be a mixture of different alkenyl aromatic polymers such as polystyrene homopolymer and a block copolymer of styrene and butadiene. Unless stated otherwise or unless the context requires otherwise, any reference in this disclosure or the claims to alkenyl aromatic polymer shall mean and include a single alkenyl aromatic polymer or a mixture of a plurality of different alkenyl aromatic polymers.

Blends of polyphenylene ether and alkenyl aromatic polymer ("PPE/PS" blends) are described in the patent literature including U.S. Pat. No. 3,383,435 (Cizek) and U.S. Pat. No. 4,727,093 (Allen). These patents are incorporated by reference herein.

Polyphenylene ether resins and alkenyl aromatic polymers are combinable in all proportions. It is contemplated, however, that the PPE/PS blends or compositions used in the practice of this invention will have at least 2 weight percent PPE based upon the total weight of PPE and PS. Blends or compositions containing less than 2 weight percent PPE are considered to be primarily PS compositions and do not exhibit the beneficial property improvements associated with PPE/PS blends. It is also contemplated that the PPE/PS blends or compositions used in the practice of this invention will have at least 2 weight percent PS based upon the total weight of PPE and PS. Blends or compositions containing less than 2 weight percent PS are considered to be primarily PPE compositions. Thus the PPE content will range from 2 to 98 weight percent and the PS content will range from 98 to 2 weight percent.

Typically, PPE/PS blends used in the practice of this invention will be characterized by a PPE weight percent within the range of about 10 to about 90 weight percent based upon the total weight of PPE and PS. Preferably this range will be about 20 to about 80 weight percent based upon the total weight of PPE and PS. The amount of PS will, therefore, typically range from 90 weight percent to 10 weight percent and preferably range from about 80 weight percent to 20 weight percent based upon the total weight of PPE and PS. In a given blend or composition the sum of the PPE weight percentage and PS weight percentage will always equal 100 since these weight percentages are based upon the total weight of PPE and PS only and do not include the weight of any other components in the blend or composition.

Methods and procedures for combining polyphenylene ether (PPE) and alkenyl aromatic polymer (PS) to produce a PPE/PS blend are known to persons of skill in the art. For example, PPE (typically in powder or pellet form) can be combined with PS (typically in pellet form) by dry blending in a blender to produce a relatively uniform mixture of PPE and PS. The mixture can then be extruded from a conventional thermoplastic extruder (e.g. single or twin screw type) which subjects the mixture to compounding With sufficient temperature and shear to produce an intimate PPE/PS blend.

The extrudate in the form of strands can be quenched with cooling water. The cooled strands can be pelletized by a conventional pelletizer. The PPE/PS pellets are a convenient form but other particles (i.e. other forms) can also be used.

During the above-described blending step, additives may be incorporated into the PPE/PS blend as desired. Such additives may include, but are not limited to, rubbery impact modifiers, flame retarding agents, stabilizers for thermal and color stability, antioxidants, processing aids and plasticizers, reinforcing and extending fillers, pigments and the like. The selection and amount of additives depend upon the properties and characteristics desired in the final PPE/PS composition.

Blowing agents can be used in the compositions of this invention to facilitate or allow for the expansion of PPE/PS pellets (or other PPE/PS particles). Blowing agents and their purpose, function and use are identified and described in U.S. Pat. No. 4,727,093 (Allen) and in the Encyclopedia of polymer Science and Technology, 2nd Edition, Vol. 2, pp 434–446, both of which are incorporated by reference herein.

The blowing agents may be physical blowing agents or chemical blowing agents. Suitable blowing agents include conventional hydrocarbon or fluorocarbon physical blowing agents. The preferred hydrocarbon blowing agents are aliphatic hydrocarbons, especially those having 4 to 7 carbon atoms. Known physical blowing agents include the following:
pentanes
   n-pentane
   2-methylbutane
   2,2-dimethylpropane
1-pentene
cyclopentane
hexanes
   n-hexane
   2-methylpentane
   3-methylpentane
   2,3-dimethylbutane
   2,2-dimethylbutane
1-hexene
cyclohexane
heptanes
   n-heptane
   2-methylhexane
   2,2-dimethylpentane
   2,3-dimethylpentane
   2,4-dimethylpentane
   3,3-dimethylpentane
   3-ethylpentane
   2,2,3-trimethylbutane
1-heptene
benzene
toluene
dichloromethane
trichloromethane
trichloroethylene
tetrachloromethane
1,2-dichloroethane
1,1,2-trichlorotrifluorethane
methanol
ethanol
2-propanol
ethyl ether
isopropyl ether
acetone
methyl ethyl ketone Flourocarbon physical blowing agents include $CCl_3F$, $CCl_2F_2$, $CHClF_2$, and $CClF_2$-$CClF_2$. These are commercially available as FREON 11, FREON 12, FREON 22 and FREON 114. Other halogenated hydrocarbon physical blowing agents may include methylene chloride, chloroform, $CCL_4$ and the like.

Compressed gases (e.g. carbon dioxide and nitrogen) can be used as physical blowing agents.

Chemical blowing agents that can be used in connection with the PPE/PS composition of this invention include the following:
sodium bicarbonate
dinitrosopentamethylenetetramine
p-toluenesulfonyl hydrazide
4,4'-oxybis(benzenesulfonyl hydrazide)
azodicarbonamide (1,1'-azobisformamide)
p-toluenesulfonyl semicarbazide
5-phenyltetrazole
5-phenyltetrazole analogues
diisopropylhydrazodicarboxylate
5-phenyl-3,6-dihydro-1,3,4-oxadiazin-2-one Thermoset polyester blowing agents can also be used in the practice of this invention.

The amount of blowing agent used in the inventive composition can be any amount sufficient to effect expansion of the composition. Expansion is effected when the composition is subjected to expansion conditions (for example, steam heating as described in the Examples given below). Typically, the blowing agent will be present in an amount within the range of about 2 to about 15 weight percent based upon the total weight of PPE, PS and blowing agent.

The PPE/PS compositions of this invention include an organobromine selected from the following group:
(i) tetrabromocyclooctane,
(ii) tetrabromovinylcyclohexene,
(iii) hexabromocyclododecane,
(iv) bis (allyl ether) of tetrabromobisphenol A, and
(v) any mixture (i.e. combination) thereof (i.e. of two or more of (i). (ii). (iii) and (iv)).

Optionally more than one of these organobromines can be employed in the PPE/PS composition. Any amount of the organobromine can be used in the PPE/PS composition provided that the amount is an "effective amount." An effective amount means effective in reducing the mold cool time and/or in reducing residual blowing agents as compared to the same composition without the organobromine. It is contemplated that this invention will generally be practiced within the following limits: (i) at least about 0.1 weight percent (wt. %) organobromine, and (ii) not more than about 6 weight percent (wt. %) organobromine. More typically, the organobromine concentration will be at least about 0.2 weight percent (wt. %) and not more than about 3 weight percent (wt. %). Preferably, the organobromine will be at least about 0.5 weight percent (wt. %) and not more than about two weight percent (wt. %). The above weight percentages represent the amount of the organobromine in the PPE/PS composition based upon the total weight of PPE and PS in the composition.

The inventive composition can be created by treating a PPE/PS blend with the organobromine. Such treatment can be accomplished by impregnating the PPE/PS blend with the organobromine, or by incorporating the organobromine into the PPE/PS blend, or by contacting or combining the PPE/PS blend with the organobromine.

In addition to an organobromine selected from the above-described group, dicumyl peroxide can be included in the PPE/PS composition. The amount of dicumyl peroxide in the PPE/PS composition can be any amount effective to reduce the mold cool time of the composition and/or to reduce residual blowing agent as compared to the same composition without the dicumyl peroxide. Generally the amount of dicumyl peroxide will be at least about b 0.02 weight percent (wt. %) and not more than about 2 weight percent (wt. %). More typically, the dicumyl peroxide concentration will be at least about 0.05 weight percent (wt. %) and not more than about 1 weight percent (wt. %). The above weight percentages represent the amount of dicumyl peroxide in the PPE/PS composition based upon the total weight of PPE and PS in the composition.

If dicumyl peroxide is used in the PPE/PS composition the preferred organobromine concentration is about 0.5 to about 1 weight percent (wt. %). If dicumyl peroxide is not used in the PPE/PS composition the preferred organobromine concentration is about 1 to about 2 weight percent (wt. %).

The PPE/PS blend can be treated with the dicumyl peroxide. Such treatment can be accomplished by impregnating the PPE/PS blend with dicumyl peroxide, or by incorporating the dicumyl peroxide into the PPE/PS blend, or by contacting or combining the PPE/PS blend with dicumyl peroxide.

EXAMPLES

The examples given below describe the treatment of PPE/PS blends with an organobromines. Tables 1, 2 and 3 below summarize the experimental data (i.e., mold cool time and residual blowing agent) corresponding to thirteen PPE/PS compositions. The compositions are designated by the letters A, B, C, D, E, F, G, H, I, J, K, L and M. The compositions were made from PPE/PS pellets manufactured by the General Electric Company. The PPE/PS pellets were a blend of 20 wt. % polyphenylene ether resin and 80 wt. % polystyrene. The polyphenylene ether was poly(2,6-dimethyl-1,4-phenylene)ether with a weight average molecular weight of 42,000. The polystyrene was polystyrene homopolymer with a weight average molecular weight of 185,000. The experimental compositions included control compositions A and J (having no organobromine or synergist) and compositions F and G (having the synergist but no organobromine) and Compositions B, C, D, E, H, I, K, L and M (having an organobromine).

In Tables 1 and 2 the prepuff density is given in pounds per cubic foot. In Tables 1 and 2 the residual pentane (blowing agent) in the prepuff is given in weight percentage (wt. %) based on the total weight of the PPE and PS only in the prepuff (including blowing agent and additives). The prepuff is the PPE/PS composition after expansion but prior to molding.

In Table 3 the density of molded conditioned blocks of the PPE/PS composition is given in pounds per cubic foot. The blocks were conditioned by allowing them to sit in ambient laboratory conditions for 24 hours. In Table 3 the residual pentane (blowing agent) in the molded conditioned blocks of the PPE/PS composition is given in weight percentage (wt. %) based on the total weight of such blocks.

The manufacture and testing of composition C is described first. To produce composition C the below-identified components were introduced separately in a one gallon, jacketed, stainless steel, agitated Parr Reactor at room temperature (approximately 72° F.) to form a batch. PPE/PS pellets and demineralized water were introduced first as follows: 1,986 ml (grams) of demineralized water was mixed with 1,109.5 grams of PPE/PS pellets. The batch was about 64% water and about 36% pellets, by weight. The batch was constantly stirred by a three blade agitator as the other components were added. 8.0 ml. of 2% phosphoric acid was added to lower the pH from approximately 5.7 to 3.0. The phosphoric acid comprised 0.014% of the batch based upon weight of the pellets or 0.008% based upon weight of the water. Next, 7.76 grams of retrabromocyclooctane, as the selected organobromine, was added to the batch. The amount of tetrabromocyclooctane equaled about 0.7 weight percent (wt. %) based on the weight of the PPE/PS. 1.39 grams of dicumyl peroxide, a synergist, was added. The amount of dicumyl peroxide equaled about 0.125 wt. % based on the weight of the PPE/PS. 60.0 ml of a 5% polyvinyl alcohol ("PVA")(Kurary Poval 420) was dissolved in the composition as a suspending agent. The PVA equaled about 0.15% of the composition based on the weight of the water. Finally, 97.656 grams of normal pentane (8.8% based on weight of the PPE/PS Pellets) was added to the blend as a blowing agent.

A Micricon computer (from Research, Inc.) was utilized to control the time/temperature profile of the batch process over pre-selected time intervals as components were introduced to the reactor as described above. The computer Was programmed to proceed in eight intervals or segments. At start up, the reactor was warmed to 71° F. in two minutes prior to introducing the batch components identified above. The batch was agitated during the entire impregnation. The reactor temperature was held at 72° F. for approximately 30 minutes while the batch components were introduced separately into the reactor as described in the above paragraph. The reactor was then sealed. A steam/water closed loop circulating system was used to control batch temperature. The batch was heated to 90.0° F. in five minutes. The batch was then heated to 280.0° F. in 82 minutes. The reactor was then heated to the maximum temperature of 284.0° F. in 6.0 minutes. The batch was maintained at 284.0° F. for 300 minutes. Thereafter the batch was cooled to 84° F. and the composition was dumped into a beaker and rinsed with tap water five times.

The pellets under the conditions of the above-described impregnation process assumed a nearly spherical shape (i.e. beads). The impregnated beads were then split into two portions. One portion was placed in a fluid bed dryer using 35° C. inlet air to dry for 35 minutes. The other portion was placed in a fluid bed dryer where room temperature inlet air was used to dry the impregnated beads for 35 minutes. Tables 1, 2 and 3 below represent the results and data for the portion dried using 35° C. inlet air in the fluid bed dryer. 500 grams of the beads were lubricated with 0.05% Hi Sil 223, an amorphous silica poWder. The lubricated beads were screened through a U.S. No. 12 mesh sieve onto a U.S. No. 25 mesh sieve. The beads were then stored in a sealed glass jar for 6 to 10 days. The beads were then placed in a batch expander. Approximately 25–50 grams of impregnated beads were poured into a modified pressure cooker. The pressure cooker had an agitator mounted inside. Steam at 2 psig and 212° F. was injected into the pressure cooker through holes in the agitator. The raw beads were agitated and steamed for 400 seconds to cause expansion (i.e. the beads were subjected to expansion conditions). The expanded beads were removed from the batch expander and allowed to sit for 12 to 24 hours.

The expanded beads were then placed in a cylindrical mold approximately 5 ¾ inches in diameter and 2 ¾ inches in length. The sealed mold was placed inside a modified pressure cooker and steam was injected inside the pressure cooker for 20 seconds. The steam outlet was then closed and steam was introduced for a further 20 seconds. The steam was then turned off and the steam outlet was opened allowing the mold and the PPE/PS composition inside the mold to cool.

As the mold and PPE/PS were allowed to cool, the mold pressure (i.e. billet pressure) decreased. Thus, the temperature of the composition (in billet form) in the mold was a function of mold pressure. The billet pressure as a function of time was recorded on a strip chart recorder using a transducer to measure distortion of the bottom surface of the mold. The decrease in pressure was timed. The mold pressure for composition C decreased to 5.2 psig in 14.0 minutes. The residual pentane (blowing agent) in the prepuff (i.e. the PPE/PS composition after expansion but before molding) was 3.14 weight percent based on the total weight of the prepuff.

The above description for composition C is applicable to the other compositions except for the variations indicated below and/or in Tables 1, 2 and 3. The weight percentages (wt. %) given below for the organobromines and the dicumyl peroxide are based on the total weight of the PPE and PS only.

Composition A did not include an organobromine or synergist and the corresponding organobromine and synergist steps in the process were omitted. The mold cool time (to 5.2 psig) for composition A was greater than 60 minutes (see Table 1). Composition B included 0.2 weight percent (wt. %) of tetrabromocyclooctane and 0.125 weight percent (wt %) of dicumyl peroxide. The mold cool time (to 5.2 psig) for composition B was greater than 60 minutes (see Table 1). Compositions A and B are also compared in Table 2 where the mold cool time to 7.4 psig is recorded. Composition B, with the organobromine, cooled to 7.4 psig in 8.8 minutes. Composition A, without the organobromine, cooled to 7.4 psig in 44.5 minutes.

Composition D included an increased amount of the organobromine (2 wt.% tetrabromocyclooctane). The mold cool time (to 5.2 psig) was only 4.3 minutes. At this level of organobromine concentration, bead shrinkage and an effect on the external appearance of the PPE/PS composition was observed, making this concentration less desirable for applications that would be affected by such characteristics.

Composition E included the organobromine (0.7 wt. % tetrabromocyclooctane) but did not include the synergist (i.e. dicumyl peroxide). The mold cool time (to 5.2 psig) was 33.0 minutes which was a substantial improvement over the control (composition A) but not as substantial as the improvement achieved by composition C With the dicumyl peroxide.

Compositions F and G demonstrated the use of the synergist (dicumyl peroxide) without the organobromine. The mold cool times (to 5.2 psig) for these compositions were greater than 60 minutes.

Composition H included a different organobromine (0.7 wt. % bis (allyl ether) of tetrabromobisphenol A) which achieved an improved mold cool time (to 5.2 psig) of 24.3 minutes s compared to control composition A.

Composition 1 included tWo organobromines (0.7 wt. % tetrabromocyclooctane and 0.5 wt. % bis (allyl ether) of tetrabromobisphenol A) which achieved an improved mold cool time (to 5.2 psig) of 26.0 minutes as compared to control composition A.

Composition J was a control composition having no organobromine and no synergist. The mold cool time (to 16.4 psig) was greater than 90 minutes.

Composition K included a different organobromine (0.7 wt. % tetrabromovinylcyclohexene) and a synergist 0.125 wt % dicumyl peroxide). Mold cool time (to 16.4 psig) was significantly reduced to 10.7 minutes as compared to control composition J.

Composition L included an organobromine 0.7 wt. % tetrabromocyclooctane) and a synergist 0.125 wt. % dicumyl perocide). Mold cool time (to 16.4 psig) was significantly reduced to 3.2 minutes as compared to control composition J.

Composition M included a different organobromine (0.7 wt % hexobromocyclododecane) and a synergist 0.125 wt. % dicumyl peroxide). Mold cool time (to 16.4 psig) was significantly reduced to 5.6 minutes as compared to control Composition J.

Residual pentane in the molded conditioned blocks of compositions K, L and M (less than 0.1 wt. %) was substantially less than the residual pentane (1.4 wt. %) in the molded conditioned block of control composition J. Thus, it is observed that the oganobromine especially affects and reduces residual blowing agent content in the molded composition.

Tables 1, 2 and 3 demonstrate that the PPE/PS compositions produced by this invention have reduced mold cool times. Even small amounts of the organobromine can drastically reduce the composition's mold cool time. The use of dicumyl peroxide in combination with the organobromine achieves further improvement (i.e. reduction) in mold cool time. Tests show that the density of the composition is not substantially altered by the addition of the organobromines or the synergists. The amount of residual pentane in the prepuff state is not substantially affected but in some cases shows improvement. Table 3 shows that the residual pentane in the molded conditioned blocks (i.e. molded PPE/PS composition) is significantly reduced when the organobromine is used.

The organobromines used in these examples were characterized in terms of melting range and average percent bromine as follows:

| Organobromine | Melting Range | Average Percent Bromine |
|---|---|---|
| Tetrabromocyclooctane | 90°-95° C. | 74% |
| Tetrabromovinylcyclohexene | 70°-75° C. | 74% |
| Hexabromocyclododecane | 140°-165° C. | 74% |
| Bis(allyl ether) of tetrabromobisphenol A | 115°-120° C. | 51% |

The organobromines of this invention are not limited to the above characteristics.

TABLE 1

Molding Data for Expandable Polyphenylene Ether-Polystyrene Blends

| Reference Composition | Additives Organobromine (wt. %) | Synergist (wt. %) | Prepuff Density (pcf) | Peak Billet Pressure (Bars) | Mold Cool Time to 7.4 psig Pressure (minutes) |
|---|---|---|---|---|---|
| A | — | — | 2.60 | 4.14 | >>60 |
| B | TBCO (0.2) | DCP (0.125) | 2.65 | 4.36 | >>60 |
| C | TBCO (0.7) | DCP (0.125) | 2.58 | 3.14 | 14.0 |
| D | TBCO (2.0) | DCP (0.125) | 2.59 | 3.27 | 4.3 |
| E | TBCO (0.7) | — | 2.56 | 4.10 | 33.0 |
| F | — | DCP (0.125) | 2.57 | 4.50 | >>60 |
| G | — | DCP (0.5) | 2.61 | 3.92 | >>60 |
| H | TBPA (0.7) | — | 2.80 | 4.03 | 24.3 |
| I | TBCO (0.7) TBPA (0.125) | — | 2.68 | 3.99 | 26.0 |

TBCO Tetrabromocyclooctane
DCP Dicumyl Peroxide
TBPA Bis(allyl ether) tetrabromobisphenol A

TABLE 2

Molding Data for Expandable Polyphenylene Ether-Polystyrene Blends

| Reference Composition | Additives Organobromine (wt. %) | Synergist (wt. %) | Prepuff Density (pcf) | Peak Billet Pressure (Bars) | Mold Cool Time to 7.4 psig Pressure (minutes) |
|---|---|---|---|---|---|
| A | — | — | 2.60 | 2.5 | 44.5 |
| B | TBCO (0.2) | DCP (0.125) | 2.65 | 2.5 | 8.8 |

TABLE 3

Molding Data for Expandable Polyphenylene Ether-Polystyrene Blends

| Reference Composition | Additives Organobromine (wt. %) | Synergist (wt. %) | Molded Conditioned Blocks Density (pcf) | Residual Pentane (wt. %) | Mold Cool Time to 16.4 psig Billet Pressure (minutes) |
|---|---|---|---|---|---|
| J | — | — | 2.68 | 1.4 | >>90 |
| K | TBVCH (0.7) | DCP (0.125) | 2.82 | <0.1 | 10.7 |
| L | TBCO (0.7) | DCP (0.125) | 2.50 | <0.1 | 3.2 |
| M | HBCD (0.7) | DCP (0.125) | 2.50 | <0.1 | 5.6 |

TBCO Tetrabromocyclooctane
TBVCH Tetrabromovinylcyclohexene
HBCD Hexabromocyclododecane The foregoing description of this invention so fully reveals the general nature of this invention that others can, by applying current knowledge, readily modify such description and/or adapt it for various applications without departing from the generic concept, and therefore, such adaptations and modifications should and are intended to be comprehended within the meaning and range of equivalents of the following claims, which claims define subject matter regarded to be our invention.

We claim:
1. An expandable PPE/PS composition comprising:
(a) a blend comprising (i) polyphenylene ether and (ii) alykenyl aromatic polymer, and
(b) an organobromine selected from the group consisting of: (i) tetrabromocyclooctane, (ii) hexabromocyclododecane, (iii) tetrabromovinylcyclohexene, (iv) bis(allyl ether) of tetrabromobisphenol A, and (v) any combination thereof; wherein the amount of polyphenylene ether is within the range of about 2 weight percent to about 98 weight percent; wherein the amount of alkenyl aromatic polymer is within the range of about 98 weight percent to about 2 weight percent; wherein the amount of said organobromine is within the range of about 0.1 weight percent to about 6 weight percent; and wherein said weight percentages are based upon the total weight of polyphenylene ether and alkenyl aromatic polymer.

2. An expandable PPE/PS composition in accordance with claim 1 wherein said polyphenylene ether has units of the following formula:

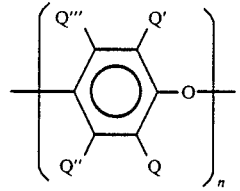

wherein Q, Q' Q" and Q''' are independently selected from the group consisting of hydrogen, halogen, hydrocarbon, halohydrocarbon, hydrocarbonoxy, and halohydrocarbonoxy; and n represents the total number of monomer units and is a integer of at least about 20.

3. An expandable PPE/PS composition in accordance with claim 2 wherein Q and Q' are alkyl and have from 1 to 4 carbon atoms each.

4. An expandable PPE/PS composition in accordance with claim 1 wherein said polyphenylene ether is poly(2,6-dimethyl-1,4-phenylene) ether.

5. An expandable PPE/PS composition in accordance with claim 1 wherein said alkenyl aromatic polymer is based at least in part on units of the following formula:

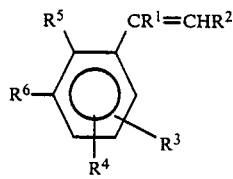

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl and alkenyl groups of from 1 to 6 carbon atoms; $R^5$ abd $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

6. An expandable PPE/PS composition in accordance with claim 5 wherein said units are styrene.

7. An expandable PPE/PS composition in accordance with claim 1 wherein said alkenyl aromatic polymer is polystyrene homopolymer.

8. An expandable PPE/PS composition in accordance with claim 7 wherein said polyphenylene ether is poly(2,6-dimethyl-1,4-phenylene) ether.

9. An expandable PPE/PS composition in accordance with claim 1 further comprising dicumyl peroxide in an amount of at least about 0.02 weight percent and not more than about 2 weight percent based upon the total weight of polyphenylene ether and alkenyl aromatic polymer.

10. An expandable PPE/PS composition in accordance with claim 9 wherein the amount of dicumyl peroxide is at least about 0.05 weight percent and not more than about 1 weight percent.

11. An expandable PPE/PS composition in accordance with claim 1 wherein the amount of organobromine is at least about 0.2 weight percent and nor more than about 3 weight percent.

12. An expandable PPE/PS composition in accordance with claim 1 wherein the amount of organobromine is at least about 0.5 weight percent and not more than about 2 weight percent.

13. An expandable PPE/PS composition in accordance with claim 1 further comprising a blowing agent in an amount within the range of about 2 to about 15 weight percent based upon the total weight of polyphenylene ether, alkenyl aromatic ploymer and blowing agent.

14. An expandable PPE/PS composition in accordance with claim 13 wherein said blowing agent is a physical blowing agent.

15. An expandable PPE/PS composition in accordance with claim 1 wherein said organobramine is tetrabromocyclooctane.

16. An expandable PPE/PS composition in accordance with claim 1 wherein said organobramine is hexabromocyclododocane.

17. An expandable PPE/PS composition in accordance with claim 1 wherein said organobramine is tetrabromovinylcyclohexene.

18. An expandable PPE/PS composition in accordance with claim 1 wherein said organobramine is bis-(allyl ether) of tetrabromobisphenol A.

19. An expandable PPE/PS composition in accordance with claim 1 wherein the amount of polyphenylene ether is within the range of about 10 weight percent to about 90 weight percent and the amount of alkenyl aromatic polymer is within the range of about 90 weight percent to about 10 weight percent.

20. An expandable PPE/PS composition comprising;
(a) a blend comprising (i) polyphenylene ether and (ii) alykenyl aromatic polymer,
(b) an organobromine selected from the group consisting of: (i) tetrabromocyclooctane. (ii) hexabromocyclododecane, (iii) tetrabromovinylcyclohexene, (iv) bis(allyl ether) of tetrabromobisphenol A, and (v) any combination thereof, and
(c) blowing agent;
wherein the amount or polyphenylene ether is within the range of about 2 Weight percent to about 98 weight percent; wherein the amount of alkenyl aromatic polymer is within the range of about 98 weight percent to about 2 weight percent; wherein said weight percentages are based upon the total weight of polyphenylene ether and alkenyl aromatic polymer; wherein the amount of said organobromine is an amount sufficient to effect reduction of the mold cool time of said composition; and wherein the amount of said blowing agent is an amount sufficient to effect expansion of said composition.

21. An expandable PPE/PS composition in accordance with claim 20 wherein said polyphenylene ether has units of the following formula:

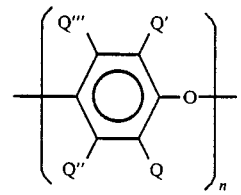

wherein Q, Q' Q" and Q'" are independently selected from the group consisting of hydrogen, halogen, hydrocarbon, halohydrocarbon, hydrocarbonoxy, and halohydrocarbonoxy; and n represents the total number of monomer units and is an integer of at least about 20; wherein said alkenyl aromatic polymer is based at least in part on units of the following formula:

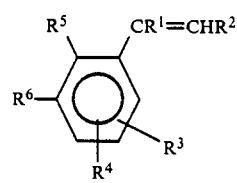

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl and alkenyl groups of from 1 to 6 carbon atoms; $R^5$ abd $R^6$ are selected from the group consisting of hydrogen and lower alkyl and alkenyl groups of from 1 to 6 carbon atoms; or $R^5$ or $R^6$ may be concatenated together With hydrocarbyl groups to form a naphthyl group.

22. An expandable PPE/PS composition in accordance with claim 21 wherein the weight percent of said polyphenylene ether is within the range of about 10 to about 90 weight percent and the weight percent of said alkenyl aromatic polymer is within the range of about 90 to about 10 weight percent.

23. An expandable PPE/PS composition in accordance with claim 22 wherein said blowing agent is a physical blowing agent.

24. An expandable PPE/PS composition in accordance with claim 23 further comprising dicumyl peroxide in an amount sufficient to reduce the mold cool time of said composition.

25. An expandable PPE/PS composition in accordance with claim 23 wherein said organobramine is tetrabromocyclooctane.

26. An expandable PPE/PS composition in accordance with claim 23 wherein said organobramine is hexabromocyclododecane.

27. An expandable PPE/PS composition in accordance with claim 23 wherein said organobramine is tetrabromovinylcyclohexene.

28. An expandable PPE/PS composition in accordance with claim 23 wherein said organobramine is bis(allyl ether) of tetrabromobisphenol A.

29. An expandable PPE/PS composition comprising:
   (a) a blend comprising (i) polyphenylene ether and (ii) alykenyl aromatic polymer,
   (b) an organobromine selected from the group consisting of: (i) tetrabromocyclooctane, (ii) hexabromocyclododecane, (iii) tetrabromovinylcyclohexene, (iv) bis(allyl ether) of tetrabromobisphenol A, and (v) any combination thereof, and
   (c) blowing agent;

wherein the amount of polyphenylene ether is within the range of about 2 weight percent to about 98 weight percent; wherein the amount of alkenyl aromatic polymer is Within the range of about 98 weight percent to about 2 weight percent; wherein said weight percentages are based upon the total weight of polyphenylene ether and alkenyl aromatic polymer; wherein the amount of said organobromine is an amount sufficient to effect reduction of residual blowing agent in said composition following molding of said composition; and wherein the amount of said blowing agent is an amount sufficient to effect expansion of said composition.

30. An expandable PPE/PS composition in accordance with claim 29 wherein said alkenyl aromatic polymer is polystyrene.

31. An expandable PPE/PS composition produced by the method comprising: treating a PPE/PS blend with an organobromine; wherein said PPE/PS blend comprises (i) polyphenylene ether and (ii) alkenyl aromatic polymer; wherein the amount of polyphenylene ether is within the range of about 2 weight percent to about 98 weight percent; wherein said weight percentages are based upon the total weight of polyphenylene ether and alkenyl aromatic polymer; wherein said organobromine is selected from the group consisting of: (i) tetrabromocyclooctane, (ii) hexabromocyclododecane, (iii) tetrabromovinylcyclohexene, (iv) bis(allyl ether) of tetrabromobisphenol A, and (v) any combination thereof; and wherein the amount of said organobromine is an amount sufficient to reduce said PPE/PS composition's mold cool time.

32. A composition in accordance with claim 31 wherein said PPE/PS blend is also treated with a blowing agent in an amount sufficient to effect expansion of said compotition.

33. A composition in accordance with claim 32 wherein said PPE/PS blend is in the form of pellets, beads or other particles; wherein said PPE/PS blend is introduced into a reactor; wherein water is introduced into said reactor; wherein said organobromine is introduced into said reactor; wherein said blowing agent is introduced into said reactor; wherein the components form a batch; wherein the batch is agitated; wherein the batch is heated at a temperature sufficient to cause impregnation or incorporation of said organobromine and said blowing agent into said PPE/PS blend.

34. A composition in accordance with claim 33 wherein dicumyl peroxide is also introduced into said reactor and subjected to said agitation and said temperature.

* * * * *